United States Patent
Dannhäuser et al.

(10) Patent No.: US 11,821,469 B2
(45) Date of Patent: Nov. 21, 2023

(54) MULTI-PLATE CLUTCH, IN PARTICULAR A DRY MULTI-PLATE CLUTCH, IN PARTICULAR FOR A HYBRID DRIVETRAIN

(71) Applicant: Schaeffler Technologies AG & Co. KG, Herzogenaurach (DE)

(72) Inventors: Matthias Dannhäuser, Eisingen (DE); Florian Vogel, Bühl (DE); Christian Basler, Offenburg (DE); Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 91 days.

(21) Appl. No.: 17/436,672

(22) PCT Filed: Mar. 10, 2020

(86) PCT No.: PCT/DE2020/100166
§ 371 (c)(1),
(2) Date: Sep. 7, 2021

(87) PCT Pub. No.: WO2020/207524
PCT Pub. Date: Oct. 15, 2020

(65) Prior Publication Data
US 2022/0136566 A1   May 5, 2022

(30) Foreign Application Priority Data

Apr. 10, 2019 (DE) .................... 10 2019 109 418.6
May 14, 2019 (DE) .................... 10 2019 112 566.9

(51) Int. Cl.
*F16D 13/56* (2006.01)
*F16D 13/64* (2006.01)
(Continued)

(52) U.S. Cl.
CPC ........... *F16D 13/56* (2013.01); *F16D 13/648* (2013.01); *F16D 13/69* (2013.01); *F16D 13/52* (2013.01); *F16D 2013/642* (2013.01)

(58) Field of Classification Search
CPC .......... F16D 13/52; F16D 13/56; F16D 13/64; F16D 2013/642; F16D 13/648;
(Continued)

(56) References Cited

U.S. PATENT DOCUMENTS 2,174,240 A * 9/1939 Glenney ................. F16D 13/69
192/70.28
6,347,695 B1 * 2/2002 Kuhn ...................... F16D 13/72
192/106 F
(Continued)

FOREIGN PATENT DOCUMENTS

CN          1910381 A     2/2007
CN        108138900 A     6/2018
(Continued)

*Primary Examiner* — Richard M Lorence

(57) ABSTRACT

A multi-plate clutch includes an outer plate mounted on a radial outside and axially displaceable, an inner plate mounted on a radial inside and axially displaceable, and a plurality of leaf springs. The plurality of leaf springs is distributed around an outer circumference of the outer plate to mount the outer plate in a torque-transmitting manner on a rotor pot, or the plurality of leaf springs is distributed in an inner circumference of the inner plate to mount the inner plate in a torque-transmitting manner on a driving ring. In an example embodiment, the multi-plate clutch is a dry multi-plate clutch for a hybrid drivetrain. In an example embodiment, the multi-plate clutch includes a plurality of outer plates and a plurality of inner plates.

20 Claims, 3 Drawing Sheets

(51) Int. Cl.
*F16D 13/69* (2006.01)
*F16D 13/52* (2006.01)

(58) Field of Classification Search
CPC ....... F16D 13/683; F16D 13/69; B60K 6/387; B60K 6/48; B60K 2006/4825; H02K 7/006; H02K 7/108
See application file for complete search history.

(56) References Cited

U.S. PATENT DOCUMENTS

2007/0131515 A1  6/2007  Vatin et al.
2018/0051754 A1  2/2018  Lindemann et al.

FOREIGN PATENT DOCUMENTS

| CN | 109072988 A | 12/2018 |
|---|---|---|
| DE | 3100586 A1 | 8/1982 |
| DE | 3320977 C1 | 12/1984 |
| DE | 02008006155 A1 | 7/2009 |
| DE | 102017130350 A1 | 6/2019 |
| JP | S5986716 A | 5/1984 |
| JP | 2014062556 A | 4/2014 |

* cited by examiner

MULTI-PLATE CLUTCH, IN PARTICULAR A DRY MULTI-PLATE CLUTCH, IN PARTICULAR FOR A HYBRID DRIVETRAIN

CROSS-REFERENCE TO RELATED APPLICATIONS

This application is the United States National Phase of PCT Appln. No. PCT/DE2020/100166 filed Mar. 10, 2020, which claims priority to German Application Nos. DE102019109418.6 filed Apr. 10, 2019 and DE102019112566.9 filed May 14, 2019, the entire disclosures of which are incorporated by reference herein.

TECHNICAL FIELD

The present disclosure relates to a multi-plate clutch, e.g., a dry multi-plate clutch, e.g., for a hybrid drivetrain, and to a hybrid drivetrain having a dry K0 multi-plate clutch for coupling and uncoupling an internal combustion engine, and/or having a dry multi-plate clutch integrated into the rotor of an electric machine, such as an electric motor or a generator.

BACKGROUND

Multi-plate clutches are usually multi-disc clutches in which the plates are mounted so that they can move freely in the axial direction. When opening and closing the clutch, they are moved axially within a corresponding external or internal toothing. Apart from the toothing of the plates on the associated plate carrier, there is no other centering or positioning of the plates. In every tooth there is surface contact between the components involved, so that (due to tolerances) it can easily lead to unfavorable positioning or jamming. This leads to high friction losses in the clutch. In addition, the geometry of the plate carrier is very complex, which leads to high manufacturing costs.

SUMMARY

The multi-plate clutch according to the present disclosure, e.g., a dry multi-plate clutch, e.g., for a hybrid drivetrain, e.g., of a motor vehicle, has at least one outer plate mounted on the outside in the radial direction and displaceable in the axial direction and at least one inner plate mounted on the inside in the radial direction and displaceable in the axial direction. The outer plate is mounted in a torque-transmitting manner on a rotor pot via a plurality of leaf springs distributed around the outer circumference, and/or the inner plates are mounted in a torque-transmitting manner on a driving ring via a plurality of leaf springs distributed in the inner circumference.

The at least one outer plate is designed as a steel plate(s) and the at least one inner plate is designed as a lining plate(s). Alternatively, the at least one outer plate is designed as a lining plate(s) and the at least one inner plate is designed as a steel plate(s).

In the axial direction, the lining plate has friction plates on at least one side, e.g., on both sides, i.e., friction surfaces which are brought into frictional engagement e.g., with adjacent steel plates. In this case, the lining plate may be formed by two friction plates that are materially connected to a carrier plate (lining carrier), e.g., glued. The friction plates may be riveted to the lining carrier or carrier plate.

The disclosed device realizes the axial movement of the dry plates when opening and closing the clutch without friction or almost without friction. For this purpose, these are each mounted on at least three leaf springs or leaf spring packs. A low leaf spring force/stiffness should be the aim. At the same time, however, there must be sufficient transmission reliability of the applied torque. During the torque transmission (i.e., when the clutch is completely or almost completely closed), the sliding friction becomes greater than the axial leaf spring force and the leaf spring can no longer slide in its guide (=friction rubbing). However, the plate can continue to move axially due to the resulting leaf spring deflection. As a result, the friction of the plates in the axial direction and the resulting friction losses of the multi-plate clutch are reduced.

According to an example embodiment, the leaf springs are formed in one piece with a lining carrier of a lining plate mounted on the inside or outside, in that both ends of each leaf spring, which are spaced apart in the circumferential direction, merge into the lining carrier. The leaf springs are thus integrated directly into the lining carrier or the carrier plate as axial spring elements.

According to an example embodiment, the leaf springs are connected, e.g., riveted, to an externally or internally mounted steel plate in that both ends of each leaf spring, which are spaced apart in the circumferential direction, are connected, e.g., riveted, to the steel plate. This enables a simple construction of a lining plate and/or steel plate.

An example embodiment includes the leaf springs on the outer plate and/or the inner plate evenly distributed in the circumferential direction. This enables a uniform distribution of the corresponding spring forces of the leaf springs over the circumference of the outer plate and/or inner plate, which further reduces the risk of increased friction and even possible jamming of the outer plates and/or the inner plates.

A symmetrical configuration of at least three leaf springs per outer plate or inner plate, for example, has been found to be beneficial, since this enables a uniform distribution of the spring forces of the leaf springs in the circumferential direction and an imbalance can be avoided. In the case of plate packs, these are formed from a corresponding number of identical outer plates or inner plates, so that at least three leaf spring packs are formed per plate pack.

According to an example embodiment, a rotor carrier for connection to the rotor pot is formed which has axial grooves on the inside in the radial direction in which corresponding arms of the rotor pot engage. The interaction of grooves and arms enables torque to be transmitted between the rotor pot and the rotor carrier. A welded connection between the rotor pot and the rotor carrier can thus be omitted. In this context, the arms of the rotor pot may serve to support the leaf springs of the outer plates, and the leaf springs have recesses corresponding to the arms. This enables simple assembly and disassembly of the corresponding outer plates.

Furthermore, a hybrid drivetrain having a multi-plate clutch is proposed according to the present disclosure, which is designed as a K0 clutch for coupling and uncoupling an internal combustion engine, and/or which is integrated into the rotor of an electric machine, such as an electric motor or a generator.

As a precaution, it should be noted that the numerals used here ("first", "second", etc.) serve primarily (only) to distinguish between several similar objects, sizes, or processes, and in particular no necessary dependency and/or sequence of these objects, sizes, or processes to each other is purported. If a dependency and/or sequence is necessary, this is explicitly stated here or results in a manner obvious to the person skilled in the art when studying the specifically described configuration.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference signs indicate the same objects, so explanations from other figures can also be used. In the figures.

DETAILED DESCRIPTION

Figure 1:
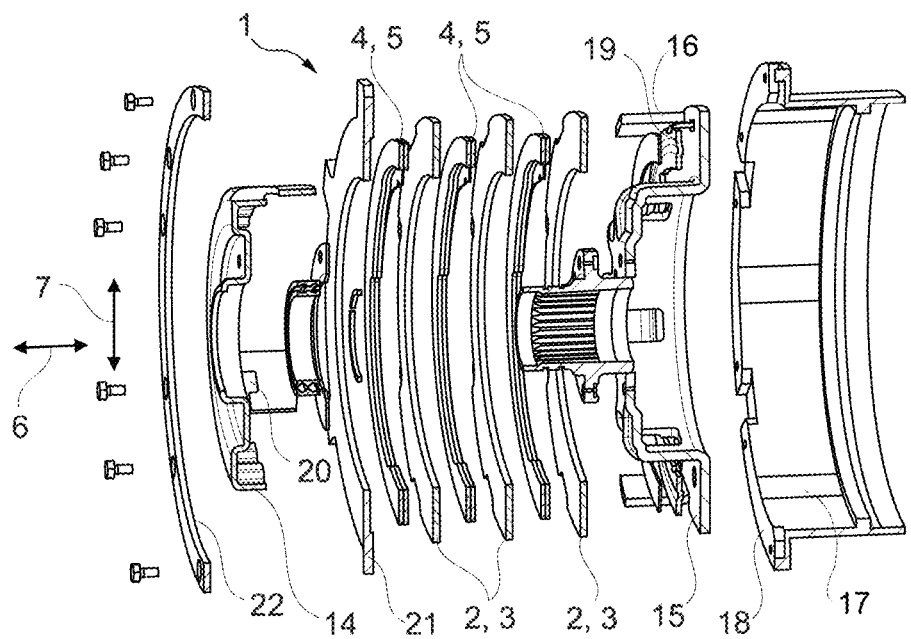
FIG. 1 shows an example of a structure of a multi-plate clutch.

FIG. 1 shows, by way of example and schematically, the structure of a multi-plate clutch 1, which is designed, for example, as a dry multi-plate clutch 1. This includes, inter alia, a plurality of outer plates 2, which are designed here as steel plates 3, and a corresponding plurality of inner plates 4, which are designed here as lining plates 5. The multi-plate clutch 1 has a first axial direction 6 and a second radial direction 7. The outer plates 2 are mounted on the outside in the radial direction 7 and are displaceable in the axial direction 6. The inner plates 4 are mounted on the inside in the radial direction 7 and are displaceable in the axial direction 6. By shifting the inner plates 4 and the outer plates 2 relative to each other in the axial direction 6, inner plates 4 and outer plates 2 adjacent in the axial direction 6 can be brought into frictional engagement with one another, so that torque can be transmitted from the inner plates 4 to the outer plates 2 and vice versa.

Figure 2:
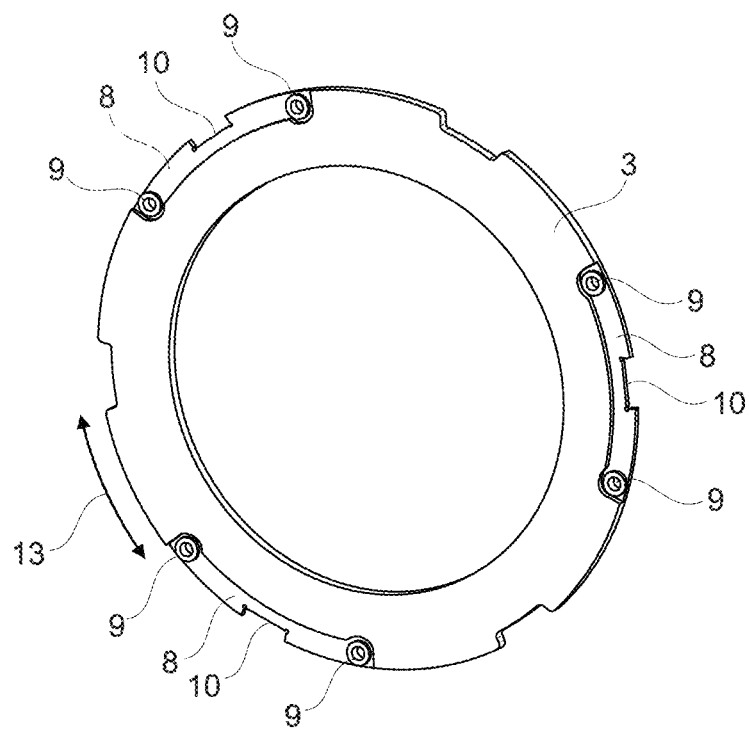
FIG. 2 shows an example of a structure of a steel plate.

FIG. 2 shows an example of a steel plate 3 having a torsional vibration damper. This has three leaf springs 8 which are evenly distributed in the circumferential direction, i.e., are designed in such a way that adjacent leaf springs 8 enclose the same angle with one another. The leaf springs 8 are formed from a spring steel and are connected to the steel plate 3 via hollow rivets 9. Both ends of each leaf spring 8, which are spaced apart from one another in a circumferential direction 13, are connected to the steel plate 3 by the hollow rivets 9. Each leaf spring 8 has a recess 10, the function of which is explained below.

Figure 3:
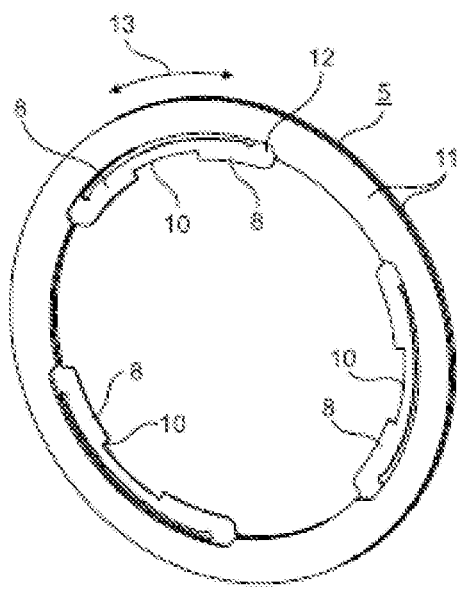
FIG. 3 shows an example of a structure of a lining plate.

FIG. 3 shows an example of a lining plate 5 which can be used as an inner plate 4. This has two friction plates 11 which are formed on opposite sides of a lining carrier 12. The lining plate 5 may have three leaf springs 8, for example. The leaf springs 8 are formed in one piece with the lining carrier 12, in that both ends of each leaf spring 8, which are spaced apart in the circumferential direction 13, merge into the lining carrier 12. Each leaf spring 8 has a recess 10, the function of which is explained below.

In the following, reference is again made to FIG. 1. The multi-plate clutch 1 also has a driving ring 14 on which the inner plates 4 are mounted in a torque-transmitting manner. The outer plates 5 are mounted from a rotor pot 15. In operation, in the engaged state of the multi-plate clutch 1, torque can be transmitted between the driving ring 14 via the inner plates 4 and the outer plates 5 to the rotor pot 15 and vice versa, depending on whether the operation is pulling or pushing. The rotor pot 15 has a plurality of arms 16 which extend from the rotor pot in the axial direction 6. These arms 16, of which, for example, three are formed per rotor pot 15, have a plurality of functions. By interacting with corresponding axial grooves 17 of a rotor carrier 18, into which the arms 16 are inserted, torque can be transmitted between the rotor pot 15 and the rotor carrier 18. Furthermore, the arms 16 serve to support the outer plates 5, in that they interact with the recesses 10 of the leaf springs 8 of the outer plates 5 (see FIG. 2).

In the engaged state, the torque is introduced or discharged via the recesses 10. In order to enable torque transmission both in pushing and pulling operation, the recesses 10 are U-shaped, so that a corresponding contact surface results in both circumferential directions 13. Alternatively, the recesses 10 can also have an O-shape.

When the multi-plate clutch is engaged, there is a relative movement between the inner plates 4 and the driving ring 14 or between the outer plates 2 and the rotor carrier 18, Which takes place, for example, via a pressure pot 19. The leaf springs 8 produce a relatively large axial movement of the corresponding inner plate 4 and outer plate 2 with minimal friction during the relative movement; a sliding movement, for example, between the lining carrier 12 and the corresponding leaf spring guides 20 is avoided. Similarly, the presence of a small amount of friction during the relative movement between the arms 16 and the recesses 10 results in a significantly greater movement of the outer plate 2 in the axial direction 6. Here, too, a sliding movement between the arms 16 and recesses 10 is avoided.

Furthermore, the multi-plate clutch 1 has a pressure plate 21 which supports the pressure force. The pressure plate 21 is screwed to the rotor carrier 18. Furthermore, the multi-plate clutch 1 includes a mounting ring 22 for fixing the pressure plate 21 on the rotor carrier 18.

Figure 4:
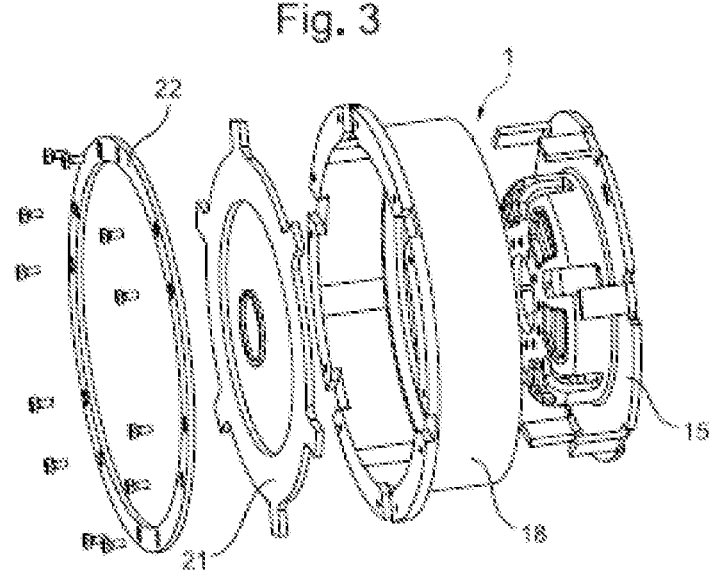
FIG. 4 shows a further view of the example of a multi-plate clutch.

FIG. 4 shows a further view of the multi-plate clutch 1 with the mounting ring 22, pressure plate 21, rotor carrier 18 and rotor pot 15.

Figures 5, 6, 7:
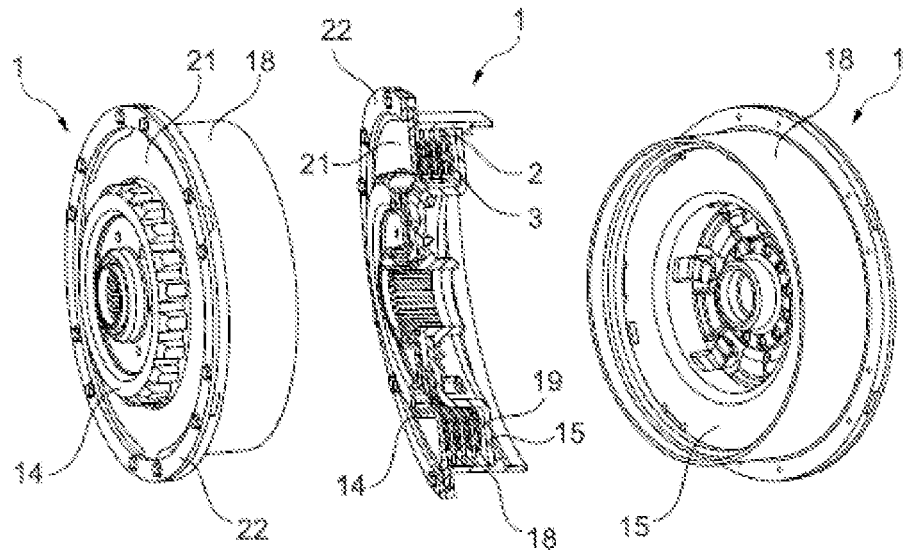
FIG. 5 shows a first perspective view of the assembled multi-plate clutch.
FIG. 6 shows a second perspective view of the assembled multi-plate clutch.
FIG. 7 shows a third perspective view of the assembled multi-plate clutch.

FIGS. 5 to 7 show different perspective views of the assembled multi-plate clutch 1. Reference is made to the embodiments above.

Figure 8:
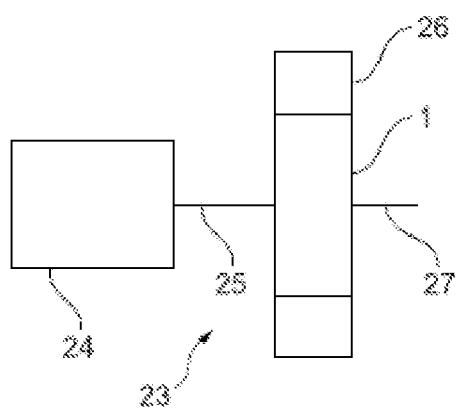
FIG. 8 shows a hybrid drivetrain of a motor vehicle.

FIG. 8 schematically shows a hybrid drivetrain 23 in particular of a motor vehicle with an internal combustion engine 24, which is connected to the multi-plate clutch 1 via a crankshaft 25, which is designed here as a K0 or disconnect clutch for separating and connecting the internal combustion engine 24 from the hybrid drivetrain 23. The multi-plate clutch 1 is designed concentrically with an electric machine 26. Torque can be transmitted to the wheels of the motor vehicle (not shown) via an output shaft 27. The output shaft 27 can be connected to the multi-plate clutch 1 and the electric machine 26. The multi-plate clutch 1 is integrated, for example, into a rotor of the electric machine 26. The electric machine 26 is may be an electric motor and/or an electric generator.

The arrangement of steel plates 3 and lining plates 5 can in principle take place in both directions (inside and outside). In the present description, however, only the case is dealt with in which the lining plates (see FIG. 3) are located on the inside (inner plates 4) and thus absorb the motor torque from the driving ring (14) and transmit it to the outer steel plates 3 (outer plates 2) (FIG. 2). This is achieved via a carrier plate (lining carrier 12), which is glued between two linings (friction plates 11) to form what is termed a lining plate 5 (see FIG. 3). In the carrier plate (lining carrier 12) there are at least three spring elements (leaf springs 8) with internal cut-outs (recesses 10) in the circumferential direction 13. In these cut-outs (recesses 10) the torque is applied to the carrier plate (lining carrier 12) and thus to the friction plates 11. The torque can be transmitted in both directions, as there is a U-shaped contact (an O-shaped contact would also be possible depending on the space available). The spring elements (leaf springs 8) should have low axial rigidity in order to enable an axial movement of the plate with minimal sliding friction. As a result, a sliding movement between the carrier plate (lining carrier 12) and leaf spring guide 20 is avoided.

The steel plate 3 is supported towards the outside in a similar manner. The spring elements (leaf springs 8) are designed as individual leaf springs 8 and riveted to the respective steel plate 3 (see the hollow rivets 9 in FIG. 3). Gluing on the carrier plate (lining carrier 12), however, would be possible.

Depending on the requirements and the necessary torque capacity, the clutch (multi-plate clutch 1) can includes a plurality of plate packs connected in series.

The clutch (multi-plate clutch 1) may be operated without a translation, i.e., directly via a pressure pot 19 from the release bearing. However, it is also possible to generate a translation using a plate spring or lever spring.

The pressing force is supported at the opposite axial end by a pressing plate 21 screwed to the rotor carrier 18. This saves a weld seam between the rotor pot 15 and the rotor carrier 18 and at the same time enables simple assembly/disassembly of the plates.

Axial grooves 17 are introduced on the inner diameter of the rotor carrier 18 for the transmission of torque between the rotor pot 15 and the rotor carrier 18. Corresponding arms 16 of the rotor pot 15 run through these, which at the same time also serve to support the steel plate leaf springs (leaf springs 8 of the steel plate 3).

REFERENCE NUMERALS

1 Multi-plate clutch
2 Outer plate
3 Steel plate
4 Inner plate
5 Lining plate
6 Axial direction
7 Radial direction
8 Leaf spring
9 Hollow rivet
10 Recess
11 Friction plate
12 Lining carrier
13 Circumferential direction
14 Driving ring
15 Rotor pot
16 Arm
17 Groove
18 Rotor carrier
19 Pressure pot
20 Leaf spring guide
21 Pressure plate
22 Mounting ring
23 Hybrid drivetrain
24 Internal combustion engine
25 Crankshaft
26 Electric machine
27 Output shaft

The invention claimed is:

1. A multi-plate clutch, comprising:
an outer plate mounted on a radial outside and axially displaceable;
an inner plate mounted on a radial inside and axially displaceable; and
a plurality of leaf springs, wherein:
the outer plate or the inner plate is a lining plate comprising a lining carrier;
the plurality of leaf springs is formed in one piece with the lining carrier such that circumferentially opposite ends of each of the plurality of leaf springs merge into the lining carrier; and
the plurality of leaf springs is distributed around an outer circumference of the outer plate to mount the outer plate in a torque-transmitting manner on a rotor pot; or
the plurality of leaf springs is distributed in an inner circumference of the inner plate to mount the inner plate in a torque-transmitting manner on a driving ring.

2. The multi-plate clutch of claim 1, wherein the multi-plate clutch is a dry multi-plate clutch for a hybrid drivetrain.

3. The multi-plate clutch of claim 1, further comprising a plurality of outer plates and a plurality of inner plates.

4. The multi-plate clutch of claim 1, wherein the outer plate is designed as a steel plate and the inner plate is designed as the lining plate.

5. The multi-plate clutch of claim 1, wherein the outer plate is designed as the lining plate and the inner plate is designed as a steel plate.

6. The multi-plate clutch of claim 1, wherein the plurality of leaf springs are evenly distributed in a circumferential direction.

7. The multi-plate clutch of claim 1, wherein the plurality of leaf springs includes exactly three leaf springs.

8. A hybrid drivetrain comprising the multi-plate clutch of claim 1, wherein:
the multi-plate clutch is designed as a K0 clutch for coupling and uncoupling an internal combustion engine; or
the multi-plate clutch is integrated into a rotor of an electric machine.

9. A multi-plate clutch, comprising:
an outer plate mounted on a radial outside and axially displaceable;
an inner plate mounted on a radial inside and axially displaceable; and
a plurality of leaf springs, wherein:
the outer plate or the inner plate is a steel plate;
the plurality of leaf springs are connected to the steel plate such that circumferentially opposite ends of each of the plurality of leaf springs are connected to the steel plate; and the plurality of leaf springs is distributed around an outer circumference of the outer plate to mount the outer plate in a torque-transmitting manner on a rotor pot; or the plurality of leaf springs is distributed in an inner circumference of the inner plate to mount the inner plate in a torque-transmitting manner on a driving ring.

10. The multi-plate clutch of claim 9, wherein the plurality of leaf springs are connected to the steel plate by riveting.

11. The multi-plate clutch of claim 9, wherein the multi-plate clutch is a dry multi-plate clutch for a hybrid drivetrain.

12. The multi-plate clutch of claim 9, further comprising a plurality of outer plates and a plurality of inner plates.

13. The multi-plate clutch of claim 9, wherein the outer plate is designed as the steel plate and the inner plate is designed as a lining plate.

14. The multi-plate clutch of claim 9, wherein the outer plate is designed as a lining plate and the inner plate is designed as the steel plate.

15. The multi-plate clutch of claim 9, wherein the plurality of leaf springs are evenly distributed in a circumferential direction.

16. The multi-plate clutch of claim 9, wherein the plurality of leaf springs includes exactly three leaf springs.

17. A hybrid drivetrain comprising the multi-plate clutch of claim 9, wherein:
the multi-plate clutch is designed as a K0 clutch for coupling and uncoupling an internal combustion engine; or
the multi-plate clutch is integrated into a rotor of an electric machine.

18. A multi-plate clutch, comprising:
an outer plate mounted on a radial outside and axially displaceable;
an inner plate mounted on a radial inside and axially displaceable;
a rotor carrier comprising an axial groove;
a rotor pot comprising an arm arranged in the axial groove; and
a plurality of leaf springs, wherein:
the plurality of leaf springs is distributed around an outer circumference of the outer plate to mount the outer plate in a torque-transmitting manner on the rotor pot; or
the plurality of leaf springs is distributed in an inner circumference of the inner plate to mount the inner plate in a torque-transmitting manner on a driving ring.

19. The multi-plate clutch of claim 18, wherein:
each of the plurality of leaf springs comprises a respective recess; and
the rotor pot comprises a plurality of arms, each engaged with a one of the recesses, to mount the outer plate on the rotor pot.

20. A hybrid drivetrain comprising the multi-plate clutch of claim 18, wherein:
the multi-plate clutch is designed as a K0 clutch for coupling and uncoupling an internal combustion engine; or
the multi-plate clutch is integrated into a rotor of an electric machine.

* * * * *